(12) United States Patent
Mantius et al.

(10) Patent No.: US 7,022,368 B2
(45) Date of Patent: *Apr. 4, 2006

(54) PROCESS FOR PRODUCING SUGARS AND ACIDS-RICH JUICE AND PHYTOCHEMICAL-RICH JUICE

(75) Inventors: Harold L. Mantius, North Kingstown, RI (US); Lawrence Rose, N. Dighton, MA (US)

(73) Assignee: Ocean Spray Cranberries, Inc., Lakeville-Middleboro, MA (US)

(*) Notice: Subject to any disclaimer, the term of this patent is extended or adjusted under 35 U.S.C. 154(b) by 431 days.

This patent is subject to a terminal disclaimer.

(21) Appl. No.: 09/892,110

(22) Filed: Jun. 26, 2001

(65) Prior Publication Data

US 2002/0197380 A1 Dec. 26, 2002

(51) Int. Cl.
*A23L 2/70* (2006.01)
*A23L 2/74* (2006.01)
(52) U.S. Cl. ............... 426/599; 426/481; 426/615; 426/616; 426/640
(58) Field of Classification Search ............. 426/615, 426/616, 640, 481, 599
See application file for complete search history.

(56) References Cited

U.S. PATENT DOCUMENTS

| | | | |
|---|---|---|---|
| 3,963,700 A | 6/1976 | Philip | 260/236.5 |
| 4,083,779 A | 4/1978 | Combe et al. | 210/23 H |
| 4,309,207 A | 1/1982 | Devlin | 71/79 |
| 4,474,771 A | 10/1984 | Morita | 424/195 |
| 4,643,902 A | 2/1987 | Lawhon et al. | 426/271 |
| 4,652,448 A | 3/1987 | Sadowski | 424/87 |

(Continued)

FOREIGN PATENT DOCUMENTS

WO WO 89/10703 11/1989

(Continued)

OTHER PUBLICATIONS

Nelson, P. et al. Fruit and Vegetable Juice Processing Technology, 3rd Ed., 1980, Avi Publhing co. Westport, CN., p. 66.*

*Primary Examiner*—Helen Pratt
(74) *Attorney, Agent, or Firm*—Fish & Richardson P.C.

(57) ABSTRACT

A method is described for processing fruit or vegetables, e.g., cranberries, into two different juices. One of the two juices has a relatively high level of phytochemicals and a relatively low level of sugars and acids. The other of the two juices has a relatively low level of phytochemicals and a relatively high level of sugars and acids. The method of the invention entails providing three juice streams. The first juice stream is passed through an ultrafiltration apparatus or some other apparatus that is capable of preferentially separating the relatively lower molecular weight compounds, e.g., sugars and acids, from the relatively higher molecular weight compounds, e.g., phytochemicals. This process creates two juice fractions: a juice fraction that is relatively enriched in sugars and acids and a juice fraction that is relatively enriched in phytochemicals. The second juice stream is combined with the juice fraction that is relatively enriched in sugars and acids to create a juice that has a relatively high level of sugars and acids and a relatively low level of phytochemicals. The third juice stream is combined with the juice fraction that is relatively enriched in phytochemicals to create a juice that has a relatively high level of phytochemicals and a relatively low level of sugars and acids.

14 Claims, 1 Drawing Sheet

U.S. PATENT DOCUMENTS

| | | | |
|---|---|---|---|
| 4,775,477 A | 10/1988 | Stahl et al. | 210/641 |
| 4,857,327 A | 8/1989 | Virdalm | 424/195.1 |
| 4,897,266 A | 1/1990 | Herve et al. | 424/195.1 |
| 5,057,197 A | 10/1991 | Perry et al. | 204/182.4 |
| 5,128,100 A | 7/1992 | Hollis et al. | 422/14 |
| 5,200,186 A | 4/1993 | Gabetta et al. | 424/195.1 |
| 5,403,604 A | 4/1995 | Black, Jr. et al. | 426/330.5 |
| 5,474,774 A | 12/1995 | Walker et al. | 424/195.1 |
| 5,496,577 A | 3/1996 | Gresch | 426/330.5 |
| 5,525,341 A | 6/1996 | Walker et al. | 424/195.1 |
| 5,646,178 A | 7/1997 | Walker et al. | 514/456 |
| 5,650,432 A | 7/1997 | Walker et al. | 514/456 |
| 5,840,322 A | 11/1998 | Weiss et al. | 424/405 |
| 5,908,650 A | 6/1999 | Lenoble et al. | 426/262 |
| 6,045,842 A | 4/2000 | Mozaffar et al. | 426/271 |
| 6,210,681 B1 | 4/2001 | Walker et al. | 424/195.1 |
| 6,733,813 B1 * | 5/2004 | Mantius et al. | 426/599 |

FOREIGN PATENT DOCUMENTS

| | | |
|---|---|---|
| WO | WO 92/10948 | 7/1992 |
| WO | WO 98/17386 | 4/1998 |
| WO | WO 98/24331 | 6/1998 |
| WO | WO 99/12541 | 3/1999 |
| WO | WO 01/03520 | 1/2001 |

* cited by examiner

PROCESS FOR PRODUCING SUGARS AND ACIDS-RICH JUICE AND PHYTOCHEMICAL-RICH JUICE

BACKGROUND

Fruits and vegetables contain a wide variety of compounds including sugars, acids, and phytochemical compounds. Depending on the product desired, it can be beneficial to have a relatively high level or a relatively low level of each of these compounds.

SUMMARY

A method is described for processing fruits or vegetables, e.g., cranberries, into two different juices. One of the two juices has a relatively high level of phytochemicals and a relatively low level of sugars and acids. The other of the two juices has a relatively low level of phytochemicals and a relatively high level of sugars and acids. The method of the invention entails providing three juice streams. The first juice stream is passed through an ultrafiltration apparatus or some other apparatus that is capable of preferentially separating the relatively lower molecular weight compounds, including sugars and acids, from the relatively higher molecular weight compounds, including phytochemicals. This process creates two juice fractions: a juice fraction that is enriched in sugars and acids ("a sugars and acids-rich juice fraction") and a juice fraction that is enriched in phytochemicals ("a phytochemical-rich juice fraction"). The second juice stream is combined with the juice fraction that is enriched in sugars and acids to create a juice that has a relatively high level of sugars and acids and a relatively low level of phytochemicals. The third juice stream is combined with the juice fraction that is enriched in phytochemicals to create a juice that has a relatively high level of phytochemicals and a relatively low level of sugars and acids.

Fruit or vegetable juice that has a relatively high level of phytochemicals and a relatively low level of sugars and acids can be used for a variety of purposes. For example, because many phytochemicals are believed to confer health benefits, juice that has a relatively high level of phytochemicals and a relatively low level of sugars and acids can be used in its pure form or combined with other juices to provide a health benefit enriched juice or blended juice product. In addition, juice that has a relatively high level of phytochemicals and a relatively low level of sugars and acids can be used in its pure form or combined with other juices to provide a juice or blended juice product of reduced caloric content. In addition, because such juices contain a relatively high level of pigments they can be used to enhance the color of blended juice products.

Fruit or vegetable juice that has a relatively low level of phytochemical compounds and a relatively high level of sugars and acids can also be used for a variety of purposes. For example, because such juices generally contain a low level of pigments, they can be used in product applications where reduced color is deemed to be a desirable finished product attribute. In addition, because phytochemicals often impart bitterness and astringency to the sensorial character of a juice, a juice that has a relatively high level of sugars and acids and a relatively low level of phytochemicals can be used it its pure form or combined with other juices to provide a juice or blended juice product which is sweeter, less astringent, and less bitter.

The invention features a method comprising: providing a fruit juice that is substantially free of insoluble fruit solids; treating a first portion of the fruit juice to preferentially separate the relatively lower molecular weight sugars and acids from the relatively higher molecular weight phytochemical compounds, whereby a relatively lower molecular weight sugars and acids-rich juice fraction and a relatively higher molecular weight phytochemical-rich juice fraction are produced; and combining the relatively higher molecular weight phytochemical-rich juice fraction with a second portion of the fruit juice to create a phytochemical-rich fruit juice.

In various embodiments the method further comprises: combining the relatively lower molecular weight sugars and acids-rich juice fraction with a third portion of the fruit juice to create a sugars and acids-rich fruit juice; concentrating the phytochemical-rich fruit juice by removing a portion of the water therein; and concentrating the sugars and acids-rich fruit juice by removing a portion of the water therein. In one embodiment the fruit juice is cranberry juice. In one embodiment the step of treating a first portion of the fruit juice comprises ultrafiltration.

In another aspect, the invention features a method comprising: providing a fruit juice that is substantially free of insoluble fruit solids; treating a first portion of the fruit juice to preferentially separate the relatively lower molecular weight sugars and acids from the relatively higher molecular weight phytochemical compounds, whereby a relatively lower molecular weight sugars and acids-rich juice fraction and a relatively higher molecular weight phytochemical-rich juice fraction are produced; and combining the relatively lower molecular weight sugars and acids-rich fruit juice fraction with a second portion of the fruit juice to create a sugars and acids-rich fruit juice.

In various embodiments the method further comprises: combining the relatively higher molecular weight phytochemical-rich juice fraction with a third portion of the fruit juice to create a phytochemical-rich fruit juice; concentrating the phytochemical-rich fruit juice by removing a portion of the water therein; concentrating the sugars and acids-rich fruit juice by removing a portion of the water therein. In one embodiment the fruit juice is cranberry juice. In one embodiment the step of treating a first portion of the fruit juice comprises ultrafiltration.

Other aspects of the invention include: a sugars and acids-rich fruit juice prepared by a method of the invention; a phytochemical-rich fruit juice prepared by a method of the invention; a blended juice product comprising a sugars and acids-rich fruit juice prepared by a method of the invention; a blended juice product comprising a phytochemical-rich fruit juice prepared by a method of the invention; an oral hygiene product (e.g., an oral rinse, a dentifrice, or a chewing gum) comprising a phytochemical-rich fruit juice prepared by a method of the invention; a sugars and acids-rich fruit juice powder prepared by drying a sugars and acids-rich fruit juice prepared by a method of the invention; a phytochemical-rich fruit juice powder prepared by drying a phytochemical-rich fruit juice prepared by a method of the invention; a topical antiseptic comprising a phytochemical-rich fruit juice prepared by a method of the invention; a wound dressing impregnated with a phytochemical-rich fruit juice prepared by a method of the invention; a topical antiseptic comprising a phytochemical-rich fruit juice powder prepared by a method of the invention; a wound dressing impregnated with a phytochemical-rich fruit powder prepared by a method of the invention; and a dietary supplement (e.g., in the form of a tablet or a powder) comprising a phytochemical-rich juice powder prepared by a method of the invention.

The invention also features a method comprising: providing a vegetable juice that is substantially free of insoluble vegetable solids; treating a first portion of the vegetable juice to preferentially separate the relatively lower molecular weight sugars and acids from the relatively higher molecular weight phytochemical compounds, whereby a relatively lower molecular weight sugars and acids-rich juice fraction and a relatively higher molecular weight phytochemical-rich juice fraction are produced; and combining the relatively higher molecular weight phytochemical-rich juice fraction with a second portion of the vegetable juice to create a phytochemical-rich vegetable juice.

In various embodiments the method further comprises: combining the relatively lower molecular weight sugars and acids-rich juice fraction with a third portion of the vegetable juice to create a sugars and acids-rich vegetable juice; concentrating the phytochemical-rich vegetable juice by removing a portion of the water therein; and concentrating the sugars and acids-rich vegetable juice by removing a portion of the water therein. In one embodiment the vegetable juice is carrot juice. In one embodiment the step of treating a first portion of the vegetable juice comprises ultrafiltration.

In yet another aspect, the invention features a method comprising: providing a vegetable juice that is substantially free of insoluble vegetable solids; treating a first portion of the vegetable juice to preferentially separate the relatively lower molecular weight sugars and acids from the relatively higher molecular weight phytochemical compounds, whereby a relatively lower molecular weight sugars and acids-rich juice fraction and a relatively higher molecular weight phytochemical-rich juice fraction are produced; and combining the relatively lower molecular weight sugars and acids-rich juice fraction with a second portion of the vegetable juice to create a sugars and acids-rich vegetable juice.

In various embodiments the method further comprises: combining the relatively higher molecular weight phytochemical-rich juice fraction with a third portion of the vegetable juice to create a phytochemical-rich vegetable juice; concentrating the phytochemical-rich vegetable juice by removing a portion of the water therein; concentrating the sugars and acids-rich vegetable juice by removing a portion of the water therein. In one embodiment the vegetable juice is carrot juice. In one embodiment the step of treating a first portion of the vegetable juice comprises ultrafiltration.

The details of one or more embodiments of the invention are set forth in the accompanying drawings and the description below. Other features, objects, and advantages of the invention will be apparent from the description and drawings, and from the claims.

DESCRIPTION OF DRAWING

The FIGURE is a flow chart depicting one embodiment of the invention.

DETAILED DESCRIPTION

Figure 1:
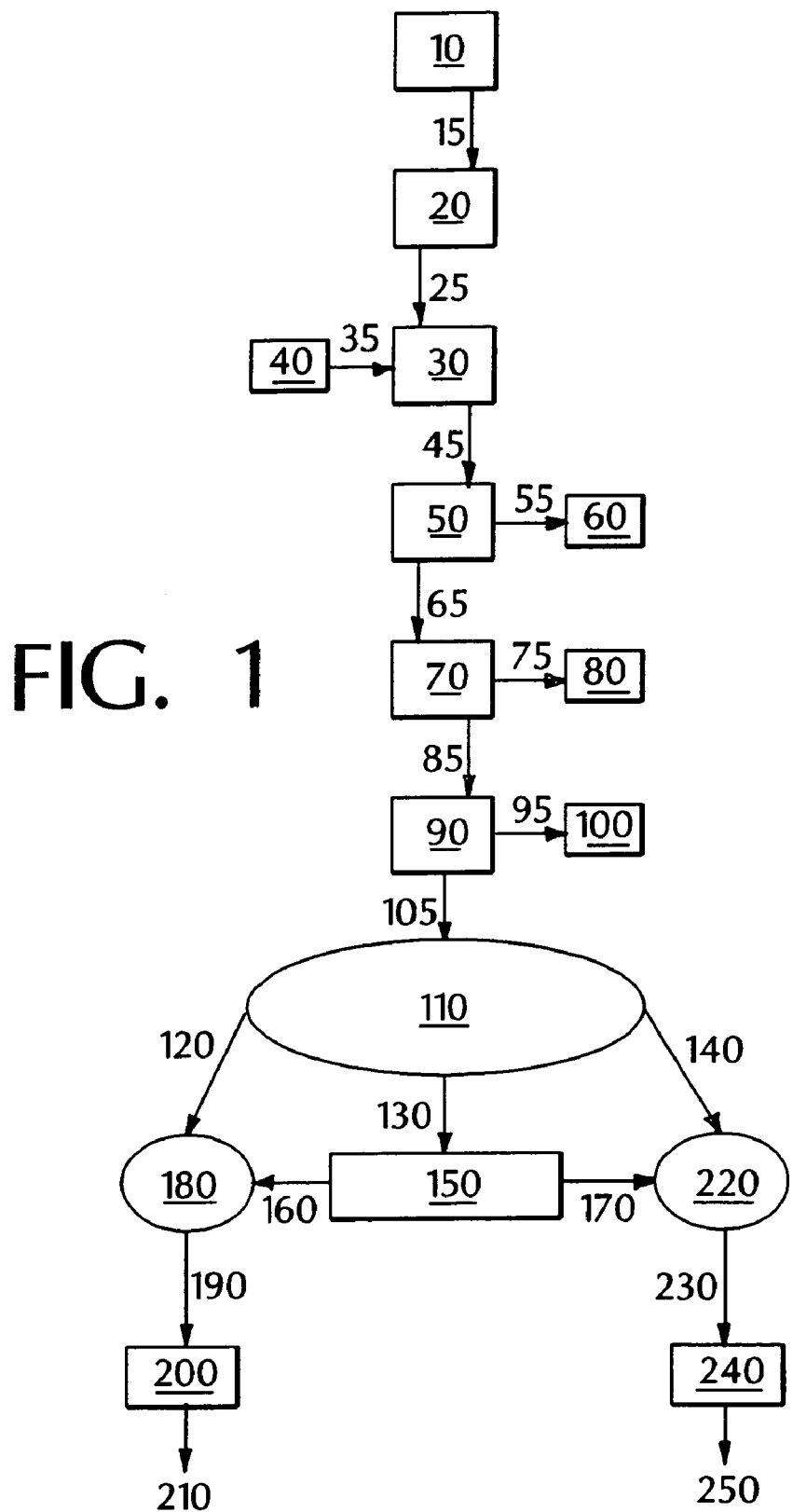

Referring to the FIGURE, a flow diagram is shown of a process for preparing two different fruit or vegetable juices: one that has a relatively high level of sugars and acids and a relatively low level of phytochemicals and one that has a relatively high level of phytochemicals and a relatively low level of sugars and acids. The process can begin with any fruit or vegetable feedstock, e.g., fruit of the genus Vaccinium. In the embodiment of the FIGURE, fruit feedstock 15 from a fruit feedstock supply 10 is conveyed to optional pulverization stage 20 where it is pulverized (e.g., using a Urshel, Inc. Comitrol Processor Model 1700), sliced, diced, chopped, ground, or treated in some other manner to reduce the fruit to a size suitable for efficient depectinization. The pulverized material 25 is conveyed to a depectinization stage 30 where it is treated with pectinase enzyme 35 provided by a pectinase enzyme supply 40 under sufficient conditions of time and temperature (e.g., about 2 hours at 110° F.–120° F.) to enable effective depectinization of the fruit mash and thereby to afford the potential for good physical separation of the resulting solid and liquid phases. The depectinized material 45 is next conveyed to an optional finishing stage 50 where it is passed through a continuous screening device (e.g., a Langsenkemp, Inc. continuous screening device with 0.033 inch openings) or otherwise treated to remove seeds, skins, twigs and the like 55 which are passed to a seeds, skins, and twigs collector 60. This finishing stage is optional, but is useful for generating clean pomace. The finished material 65 passing through the continuous screening device is next conveyed to a centrifugation stage 70 where a centrifuge (e.g., Westphalia, Inc. Model CA505) or other device, e.g., a press, is used to remove insoluble solids as a fiber-rich pomace 75 which is conveyed to a pomace collector 80. If finishing stage 50 is omitted, the seed, skins, twigs and other material that would be collected at 60 are instead passed to the pomace collector 80.

After centrifugation stage 70, a fruit juice 85 is passed to a microfiltration stage 90 where it is microfiltered (e.g., using a Koch Membrane Systems, Inc. skid with a Koch Membrane Systems, Inc. model MFK617 membrane) or effectively processed using some other separation technology to remove residual suspended insoluble solids 95 which are passed to an insoluble solids collector 100. The permeate fraction is a polished fruit juice 105. The polished fruit juice ideally contains no residual suspended solids.

The polished fruit juice 105 is passed to a ratio divert mechanism 110 that divides the juice into three streams, 120, 130, and 140. The weight fraction of each stream can be selected according to user preference. For example, 20% of juice 105 can pass to juice stream 120; 40% of juice 105 can pass to juice stream 130; and 40% of juice 105 can pass to juice stream 140.

Juice stream 130 passes to an ultrafiltration stage 150 where it is ultrafiltered (e.g., using a Koch Membrane Systems, Inc. skid with an Osmonics, Inc. model GK 3840C-50D membrane module). Alternatively, juice stream 130 is processed by some other means that preferentially separates the relatively lower molecular weight compounds, e.g., sugars and acids from the relatively higher molecular weight compounds, e.g., phytochemicals. Thus, ultrafiltration stage 150 produces a sugars and acids-rich permeate fraction 160 and a phytochemical-rich retentate fraction 170. In the case of cranberry juice, the permeate fraction thus preferably contains such organic acids as malic acid, citric acid, and quinic acid as well a sugars such as sucrose, dextrose, and fructose. The ultrafiltration step or other separation step need not effect completely efficient separation of the relatively lower molecular weight compounds, e.g., sugars and acids from the relatively higher molecular weight compounds, e.g., phytochemicals. For example, the fraction preferentially containing the relatively lower molecular weight compounds can contain at least 10%, at least 20%, at least 30%, at least 40%, at least 50%, at least 60%, at least 70%, at least 80%, at least 90%, at least 95%, or at least 98% of one or more of the relatively lower molecular weight compounds, e.g., fructose, sucrose, dextrose, malic acid, citric acid, or quinic acid, present in the unfractionated juice. Similarly, the fraction preferentially containing the relatively higher molecular weight compounds can contain at least 10%, at least 20%, at least 30%, at least 40%, at least 50%, at least 60%, at least 70%, at least 80%, at least 90%, at least 95%, or at least 98% of one or more of the relatively higher molecular weight compounds, e.g., a phytochemical, present in the unfractionated juice. As long as the phytochemical-rich retentate fraction and the sugars and acids-rich permeate fraction are significantly different in the relative proportion of their phytochemical and sugar and acid content, the employed separation technique is deemed suitable. A suitable ultrafiltration filter can have a molecular weight cutoff of about 300–500,000 Dalton, about 2,000–300,000 Dalton, about 2,000–100,000 Dalton, about 2,000 to 50,000 Dalton, about 2,000 to 10,000 Dalton, about 2,000–5,000 Dalton, about 3,000 Dalton, about 3,250 Dalton, about 3,500 Dalton, or about 3,750 Dalton on propylene glycol.

The sugars and acids-rich permeate fraction 160 passes to blender 180 where it is combined with juice stream 120 to a create a sugars and acids-rich fruit juice 190. The sugars and acids-rich fruit juice 190 can optionally pass to concentrator 200 to create a sugars and acids-rich fruit juice concentrate 210.

The phytochemical-rich retentate fraction 170 from ultrafiltration stage 150 passes to blender 220 where it is combined with juice stream 140 to create a phytochemical-rich fruit juice 230. This phytochemical-rich fruit juice 230 can optionally pass to concentrator 240 to create a phytochemical-rich fruit juice concentrate 250.

The foregoing is a description of one embodiment of the method of the invention. Those skilled in the art will be able to modify the process. For example, controlled atmosphere (e.g., $N_2$ or $CO_2$) techniques can be used during the depectinization and heat treatment stages to minimize the deleterious effects of oxidative reactions.

In another modification enzymes in addition to or instead of pectinase (e.g., enzymes which digest cellulose) can be used in the depectinization stage.

Extracted fruit produced by water extraction, e.g., countercurrent extraction, as described in U.S. Pat. No. 5,320,861, hereby incorporated by reference, or the presscake/pomace discharge of conventional fruit processing techniques used in the production of fruit juice can be used as the fruit feedstock. Moreover, instead of using whole fruit as a feedstock, leaves and other components of the fruit plant can be used. Alternatively, the fruit plant components can be used as a feedstock in combination with whole fruit.

A controlled heat treatment step can be included to increase the yield of water soluble compounds. For example, the pectinase-treated mash can be passed to a controlled high temperature heat treatment stage where it is heated to about 180° F. to further release water soluble compounds (e.g., phenolics, proanthocyanidins, and anthocyanins) bound to the solid phase (pulp, skin, and seeds). In general, the heat treatment is greater than 140° F. (e.g., at least 150° F., 160° F., 170° F., 180° F., 190° F., 200° F., 210° F., or 212° F.) and is carried out for a longer duration than the high temperature-short time (HTST) techniques that are characteristically used to deactivate enzymes naturally present in the fruit. Thus, the heat treatment preferably lasts for at least 1 minute, at least 2 minutes, at least 3 minutes, at least 5 minutes or even at least 10–15 minutes or even longer (e.g., at least 20 minutes, 30 minutes, or even 1 hour). The heat treatment can occur before or after depectinization, and depectinization is itself optional. For example, certain fruits, e.g., strawberries, may not need to be depectinized to afford the potential for good physical separation of the solid and liquid phases of the fruit mash resulting from heat treatment. Suitable heat treatment procedures are described in detail in U.S. Ser. No. 09/611,852 (filed Jul. 7, 2000) hereby incorporated by reference.

Fruit juice produced by countercurrent extraction of cranberries can be used in the methods of the invention as follows. Countercurrently extracted fruit juice can be prepared as described in U.S. Pat. Nos. 5,320,861 and 5,419,251, hereby incorporated by reference. Briefly, frozen whole raw cranberries are provided to a cleaning stage to remove debris such as twigs, leaves, etc. and then conveyed to a sorting stage which sorts fruit to a selected size. The size-selected fruit is then conveyed to a slicing stage that slices the berries to expose the inner flesh of the fruit, unprotected by the skin. The whole cranberries are preferably cut to provide slices between 6 to 8 millimeters in width. The cleaned, sized and sliced frozen cranberries are then defrosted using hot water (e.g., at about 130° F.) to a temperature of less than 75° F. (e.g., 65° F.) and conveyed to the solid input of an extractor stage which employs a countercurrent extractor described in detail in U.S. Pat. No. 5,320,861. The liquid input to the extractor is typically derived from a fruit-derived water supply. The liquid output of the extractor stage is a high-quality extract mixture of fruit-derived water and fruit juice, which is collected for further treatment and use in the methods of the invention. In addition, the extracted fruit can be used as a fruit feed stock to produce additional juice that can be used in the methods of the invention.

A number of embodiments of the invention have been described. Nevertheless, it will be understood that various modifications may be made without departing from the spirit and scope of the invention. For example, fruit juices and vegetable juices can be processed together in any desired combination. Moreover, a fruit juice fraction can be combined with a vegetable juice and a vegetable juice fraction can be combined with a fruit juice. Accordingly, other embodiments are within the scope of the following claims.

What is claimed is:

1. A method comprising:
   (a) providing a flow of fruit juice that is substantially free of insoluble fruit solids;
   (b) dividing the flow of fruit juice into at least a first juice stream, a second juice stream and a third juice stream with a ratio divert mechanism that controls the amount of juice in each of the first, second and third juice streams;
   (c) treating the first juice stream to preferentially separate the relatively lower molecular weight sugars and acids from the relatively higher molecular weight phytochemical compounds whereby a relatively lower molecular weight sugars and acids-rich juice stream and a relatively higher molecular weight phytochemical-rich juice stream are produced;
   (d) combining the sugars and acids-rich juice stream with the second juice stream to create a sugars and acids-rich fruit juice; and
   (e) combining the phytochemical-rich juice stream with the third juice stream create a phytochemical-rich fruit juice.

2. The method of claim 1, further comprising concentrating the phytochemical-rich fruit juice by removing a portion of the water therein.

3. The method of claim 1, further comprising concentrating the sugars and acids-rich fruit juice by removing a portion of the water therein.

4. The method of claim 1 wherein the fruit juice is cranberry juice.

5. The method of claim 1 wherein the step of treating a first portion of the fruit juice comprises ultrafiltration.

6. The method of claim 1, further comprising combining the phytochemical-rich fruit juice with a different juice to create a blended juice product.

7. The method of claim 1, further comprising combining the sugars and acids-rich fruit juice with different juice to create a blended juice product.

8. The method of claim 1, further comprising combining the phytochemical-rich fruit juice with a different juice to create a blended juice product.

9. The method of claim 1, further comprising combining the sugars and acids-rich fruit juice with different juice to create a blended juice product.

10. A method comprising:
   (a) providing a flow of vegetable juice that is substantially free of insoluble fruit solids;
   (b) dividing the flow of vegetable juice into at least a first juice stream, a second juice stream and a third juice stream with a ratio divert mechanism that controls the amount of juice in each of the first, second and third juice streams;
   (c) treating the first juice stream to preferentially separate the relatively lower molecular weight sugars and acids from the relatively higher molecular weight phytochemical compounds whereby a relatively lower molecular weight sugars and acids-rich juice stream and a relatively higher molecular weight phytochemical-rich juice stream are produced;
   (d) combining the sugars and acids-rich juice stream with the second juice stream to create a sugars and acids-rich vegetable juice; and
   (e) combining the phytochemical-rich juice stream with the third juice stream create a phytochemical-rich vegetable juice.

11. The method of claim 10, further comprising concentrating the phytochemical-rich vegetable juice by removing a portion of the water therein.

12. The method of claim 10, further comprising concentrating the sugars and acids-rich vegetable juice by removing a portion of the water therein.

13. The method of claim 3 wherein the vegetable juice is carrot juice.

14. The method of claim 10 wherein the step of treating a first portion of the vegetable juice comprises ultrafiltration.

* * * * *

UNITED STATES PATENT AND TRADEMARK OFFICE
CERTIFICATE OF CORRECTION

PATENT NO. : 7,022,368 B2  Page 1 of 1
APPLICATION NO. : 09/892110
DATED : April 4, 2006
INVENTOR(S) : Harold L. Mantius and Lawrence Rose It is certified that error appears in the above-identified patent and that said Letters Patent is hereby corrected as shown below:

Column 8, delete claim 14

Signed and Sealed this

Twelfth Day of December, 2006

JON W. DUDAS
*Director of the United States Patent and Trademark Office*